United States Defensive Publication [19] (H) [11] T986,002

Harrison [43] Sep. 4, 1979

[54] GRANULATION OF FERTILIZER BORATE

[75] Inventor: Cecil P. Harrison, Florence, Ala.

[73] Assignee: Tennessee Valley Authority

[21] Appl. No.: 939,541

[22] Filed: Sep. 5, 1978

[51] Int. Cl.[2] ..... C05D 9/00

[52] U.S. Cl. ..... 71/64 D; 71/37; 264/5

[57] ABSTRACT

Method for granulating crystalline fertilizer borate yielding improved product re bulk blending, handling, and storage by processing solid feedstock with small amounts of mineral acid solution. The process, which requires no drying step, comprises an improved method for converting a relatively easily prepared, nongranular, fine-crystal boron compound, sodium tetraborate pentahydrate, to granular form suitable in particle-size distribution, hardness, solubility, and other important characteristics for direct inclusion into bulk blended fertilizers to produce homogeneous, nonsegregating blends according to methods preferred by blend manufacturers. It has the particular advantage over the melt-flaking-sizing method, presently employed commercial practice of conversion of sodium tetraborate pentahydrate to suitable particle-size distribution for blending, in that it is a low-energy process and does not elevate the boron content of the product. Elevation of boron content is a distinct disadvantage in the production of granular micronutrients for fertilizer use in prior-art processes since it naturally decreases the number of particles that will carry a given amount of boron to the field and thus results in a more diffuse scattering of particles and consequent reduction in average proximity of the nutrient to plant roots.

7 Claims, No Sheets Drawing,

15 Pages Specification

The file of this unexamined application may be inspected and copies thereof may be purchased (849 O.G. 1221, Apr. 9, 1968).